United States Patent
Chang

(10) Patent No.: US 8,300,998 B2
(45) Date of Patent: Oct. 30, 2012

(54) OPTICAL FIBER CONNECTOR

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 354 days.

(21) Appl. No.: 12/749,461

(22) Filed: Mar. 29, 2010

(65) Prior Publication Data

US 2011/0064357 A1 Mar. 17, 2011

(30) Foreign Application Priority Data

Sep. 17, 2009 (CN) .......................... 2009 1 0307124

(51) Int. Cl.
  *G02B 6/32* (2006.01)
  *G02B 6/00* (2006.01)
  *G02B 6/36* (2006.01)
(52) U.S. Cl. .............................. 385/33; 385/137; 385/89
(58) Field of Classification Search ..................... 385/33, 385/137

See application file for complete search history.

(56) References Cited

U.S. PATENT DOCUMENTS

| 6,250,819 | B1 * | 6/2001 | Porte et al. ...................... 385/88 |
| 6,819,858 | B2 * | 11/2004 | Steinberg et al. .............. 385/137 |
| 7,729,569 | B2 * | 6/2010 | Beer et al. ....................... 385/14 |

* cited by examiner

*Primary Examiner* — Omar Rojas
(74) *Attorney, Agent, or Firm* — Altis Law Group, Inc.

(57) ABSTRACT

An optical fiber connector includes a main body and a cover mechanically coupled to the main body. The main body includes a coupling portion and a light guide portion extending from the coupling portion. The light guide portion includes a light incident surface and a light output surface arranged at opposite sides thereof. The coupling portion includes a first groove formed at a top surface thereof, facing the light incident surface and terminating at opposite sides of the coupling portion, and a plurality of recesses. The cover includes a second groove formed at bottom surface thereof, terminating at opposite sides of the cover, and a plurality of protrusions. The first groove and the second groove cooperatively form a receiving channel for receiving an optical fiber therein and allowing the optical fiber to be optically connected to the light guide portion.

9 Claims, 5 Drawing Sheets

OPTICAL FIBER CONNECTOR

BACKGROUND

1. Technical Field

The present disclosure relates to connectors, and particularly, to an optical fiber connector.

2. Description of Related Art

Optical fiber connectors are widely used in optical fiber communication systems.

Referring to FIG. 5, a typical optical fiber connector 10 is shown. The optical fiber connector 10 includes a main body 11 for coupling two optical fibers 12. The main body 11 includes two optical lenses 16 formed at one end surface thereof, and two buried holes 14 formed in an opposite end surface thereof. The buried holes 14 are configured for engaging the optical lenses 16 therein.

However, when the buried holes 14 are substantially equal to the optical fibers 12, it is difficult to insert the optical fibers 12 without deforming them; and when the buried holes 14 are larger than the optical fibers 12, light loss will occur.

What is needed, therefore, is an optical fiber connector which can overcome the above shortcomings.

BRIEF DESCRIPTION OF THE DRAWINGS

Many aspects of the present optical fiber connector can be better understood with reference to the following drawings. The components in the drawings are not necessarily drawn to scale, the emphasis instead being placed upon clearly illustrating the principles of the present optical fiber connector. Moreover, in the drawings, like reference numerals designate corresponding parts throughout the several views.

DETAILED DESCRIPTION

Embodiments of the present optical fiber connector will now be described in detail below and with reference to the drawings.

Figure 1:
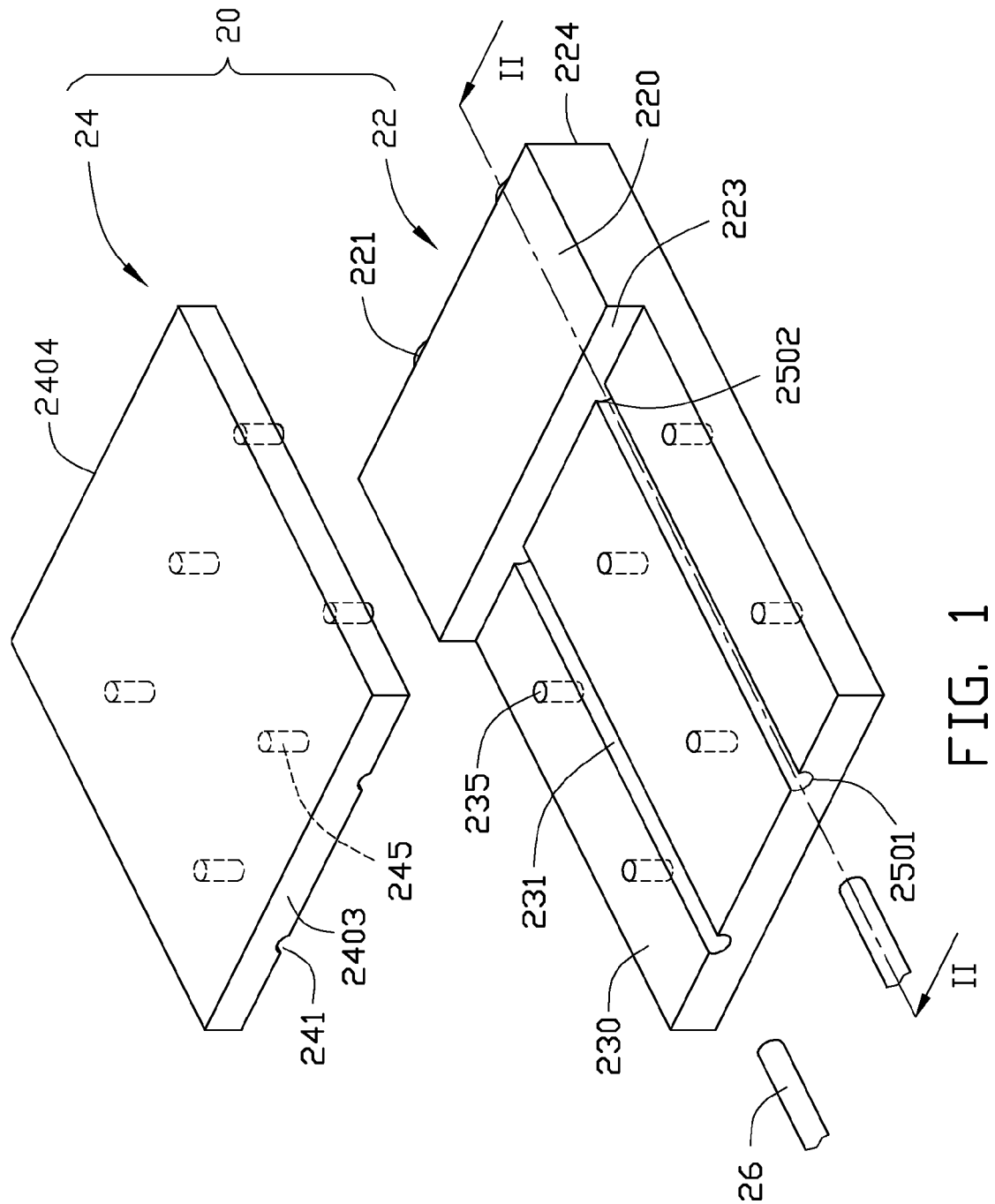
FIG. 1 is an exploded view of an optical fiber connector in accordance with a first embodiment.
Figure 2:
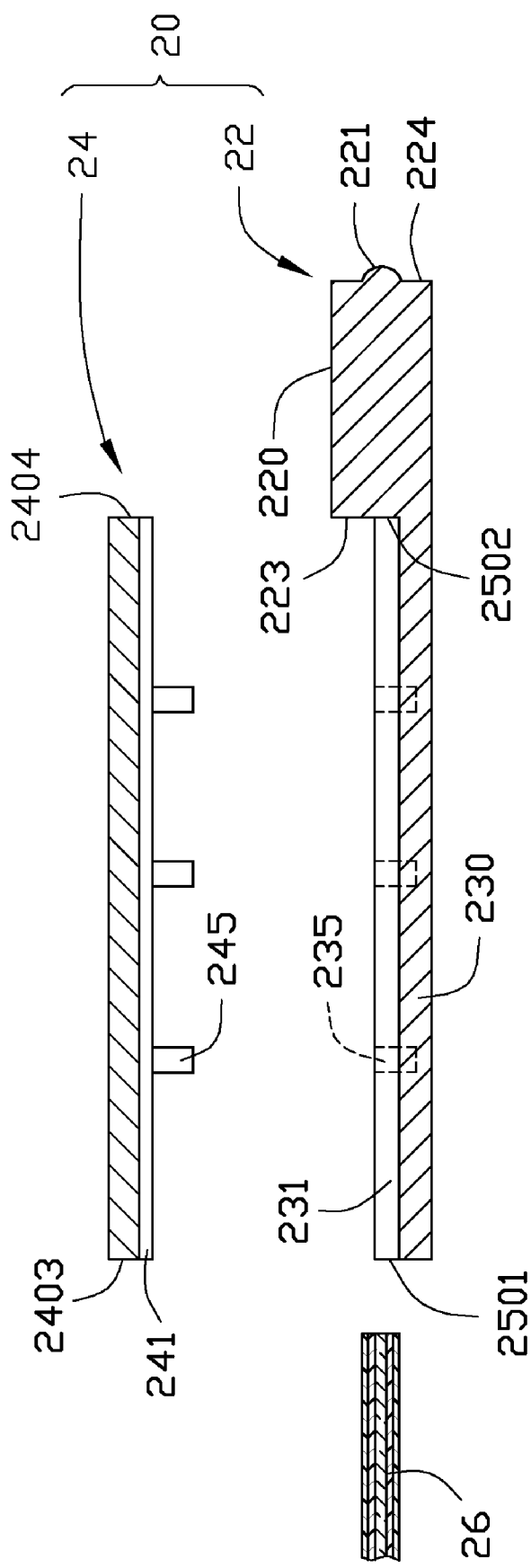
FIG. 2 is a cross sectional view of the optical fiber connector of FIG. 1, taken along II-II line in FIG. 1.
Figure 3:
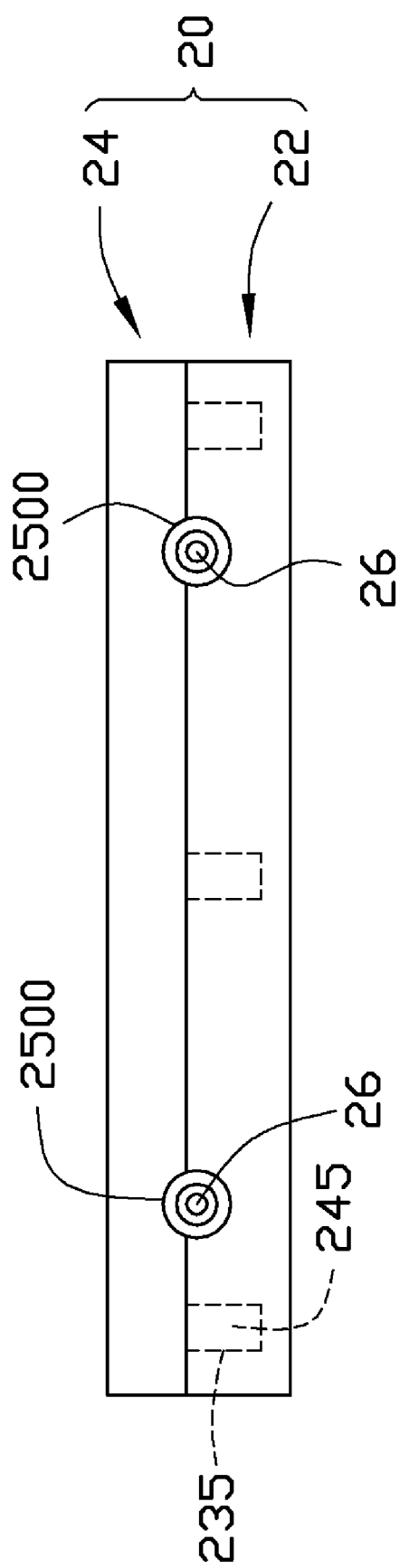
FIG. 3 is a left side elevational view of the nozzle shown in FIG. 1.

Referring to FIGS. 1 to 3, an optical fiber connector 20 for optically coupling two optical fibers 26 to other fibers or an optical device in accordance with a first embodiment, is provided. The optical fiber connector 20 includes a main body 22 and a cover 24 for coupling to the main body 22.

The main body 22 includes a coupling portion 230 and a light guide portion 220 extending from the coupling portion 230. The light guide portion 220 includes a light incident surface 223 facing the coupling portion 230, and an opposite light output surface 224. The light output surface 224 has two optical lenses 221 formed thereon, spaced apart from each other. In the present embodiment, the optical lenses 221 are integrally formed with the light output surface 224.

The coupling portion 230 is lower than the light guide portion 220, with a top surface thereof lower than a top of the light incident surface 223, and a bottom surface thereof flush with a bottom of the light incident surface 223. The top surface has two first grooves 231 formed therein, in communication with two opposite sides 2501, 2502 of the top surface. The first grooves 231 have an arc greater than 180 degrees in cross section. Optical axes of the optical lenses 221 are aligned with central axes of the first grooves 231, respectively. A number of holes 235 are formed in the top surface, around the two first grooves 231. In the present embodiment, the number of the holes 235 is six, and the holes 235 are arranged in three lines, with two holes 235 to a line.

The cover 24 includes two second grooves 241 formed in a bottom surface thereof, in communicate with two opposite sides 2403, 2404 of the bottom surface. The second grooves 241 are also arced, but a little less than 180 degrees. When the cover 24 is coupled to the coupling portion 230 of the main body 22, the first and the second grooves 231, 241 cooperatively form two cylindrical receiving channels 2500 (see FIG. 3). A sum of a height of the cover 24 and a height of the coupling portion 230 is equal to a height of the light guide portion 220. A number of posts 245 corresponding to holes 235 are formed at the bottom surface.

In application, two optical fibers 26 are first disposed in the first grooves 231, with a tip of each of them close to or in contact with the light incident surface 223. Then the cover 24 is coupled to the coupling portion 230. The posts 245 are inserted in the holes 235, and the second grooves 241 are aligned with the first grooves 231. The optical fibers 26 are partially received in the first grooves 231, and are partially received in the second grooves 241. In this way, the optical fibers 26 are connected to the optical fiber connector 20 without any deformation. Lights emitted from the optical fibers 26 reach the light incident surface 223 of the light guide portion 220 and then are guided out by the optical lenses 221 on the light output surface 224.

Figure 4:
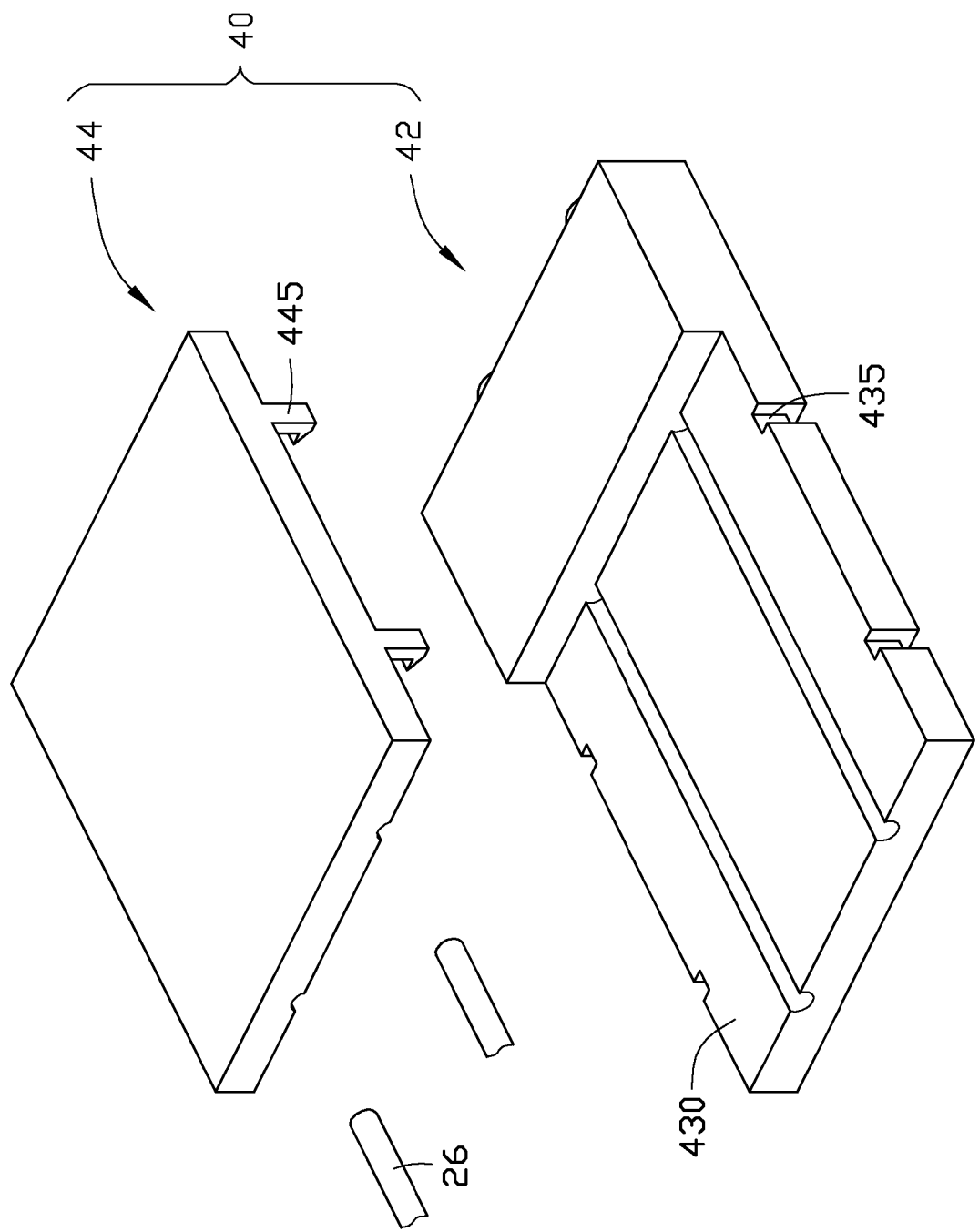
FIG. 4 is an exploded view of an optical fiber connector in accordance with a second embodiment.
Figure 5:
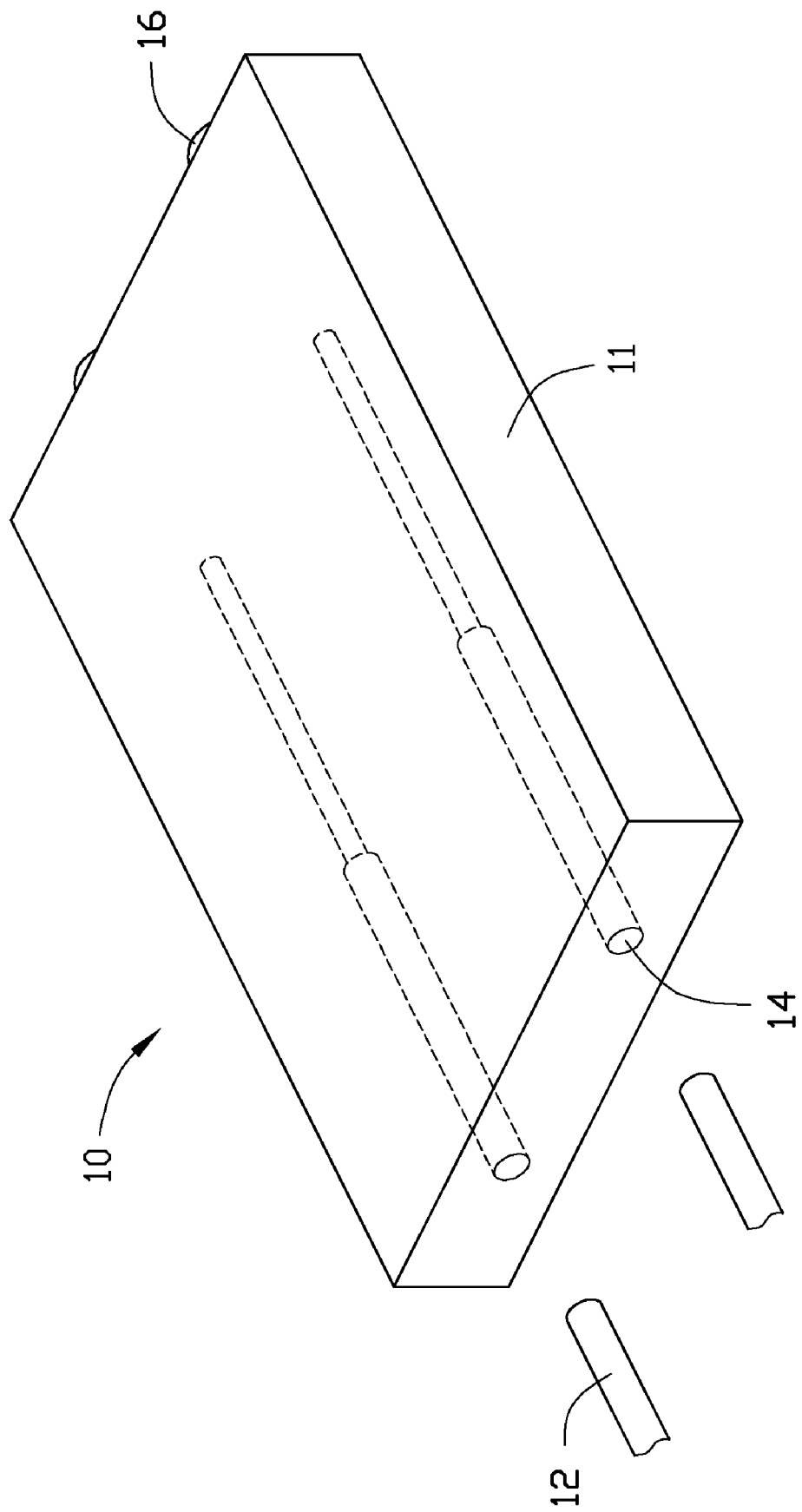
FIG. 5 is a schematic view of an optical fiber connector in accordance with a related art.

Referring to FIG. 4, an optical fiber connector 40 for optically coupling two optical fibers 26 to other fibers or a device in accordance with a second embodiment, is provided. The optical fiber connector 40 is similar to the optical fiber connector 20 illustrated above. However, a coupling portion 430 of a main body 42 includes four cutouts 435 formed at two opposite side edges thereof, and a cover 44 includes four hooks 445 formed at a bottom surface thereof, extending from opposite side surfaces thereof. The cooperation of the hooks 445 and the cutouts 435 allows the cover 44 to be mechanically coupled to the coupling portion 430 of the main body 42.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber connector, comprising:
    a unitary main body comprising a coupling portion and a light guide portion integrally extending from the coupling portion, the light guide portion comprising a light incident surface and a light output surface arranged at opposite sides thereof, the coupling portion comprising at least one first groove formed at a top surface thereof, facing the light incident surface and terminating at opposite sides of the top surface, and a plurality of one of protrusions and recesses, the at least one first groove having an arc subtending an angle greater than 180 degrees in cross section; and
    a cover comprising at least one second groove formed at a bottom surface thereof, terminating at opposite sides of the bottom surface, and a plurality of the other one of protrusions and recesses, the at least one second groove having an arc subtending an angle less than 180 degrees in cross section, the protrusions engaged in the respective recesses to couple the cover to the coupling portion of the main body, the at least one first groove and the at least one second groove cooperatively forming at least one cylindrical receiving channel for receiving at least one optical fiber therein and allowing the at least one optical fiber to be optically coupled to the light guide portion.

2. The optical fiber connector as described in claim 1, wherein the light output surface comprises at least one optical lens, aligned with the at least one receiving channel.

3. The optical fiber connector as described in claim 2, wherein a sum of a height of the coupling portion and a height of the cover is equal to a height of the light guide portion.

4. The optical fiber connector as described in claim 1, wherein the cover comprises a plurality of protrusions formed at the bottom surface thereof, and the coupling portion comprises a plurality of recesses formed at the top surface thereof.

5. The optical fiber connector as described in claim 4, wherein the protrusions are posts, and the recesses are holes.

6. The optical fiber connector as described in claim 4, wherein the protrusions include hooks, and the recesses are cutouts in which the hooks are engagingly received.

7. An optical fiber connector comprising:
a plurality of optical fibers;
a unitary main body comprising a coupling portion and a light guide portion integrally extending from the coupling portion, the light guide portion comprising a light incident surface and a light output surface arranged at opposite sides thereof, the coupling portion comprising a plurality of first grooves formed at a top surface thereof extending from the light incident surface, and a plurality of recesses formed in the top surface, each of the first grooves having an arc subtending an angle greater than 180 degrees in cross section; and
a cover comprising a plurality of second grooves formed at a bottom surface thereof, and a plurality of protrusions formed at the bottom surface, each of the second grooves having an arc subtending an angle less than 180 degrees in cross section, the protrusions engaged in the respective recesses to couple the cover to the coupling portion of the main body, the first grooves and the second grooves cooperatively forming a plurality of cylindrical receiving channels receiving the optical fibers therein and allowing the optical fibers to be optically coupled to the light incident surface of the light guide portion.

8. The optical fiber connector as described in claim 7, wherein a plurality of optical lenses are formed on the light output surface, aligned with the respective receiving channels.

9. An optical fiber connector comprising:
a unitary main body comprising a coupling portion and a light guide portion integrally extending from the coupling portion, the light guide portion comprising a light incident surface and a light output surface arranged at opposite sides thereof, the light output surface comprising a plurality of optical lenses formed thereon, the coupling portion comprising a plurality of first grooves formed at a top surface thereof extending from the light incident surface, and a plurality of recesses formed in the top surface, each of the first grooves having an arc subtending an angle greater than 180 degrees in cross section; and
a cover comprising a plurality of second grooves formed at a bottom surface thereof, and a plurality of protrusions formed at the bottom surface, each of the second grooves having an arc subtending an angle less than 180 degrees in cross section, the protrusions engaged in the respective recesses to couple the cover to the coupling portion of the main body, the first grooves and the second grooves cooperatively forming a plurality of cylindrical receiving channels aligned with the respective optical lenses and configured for receiving the optical fibers therein and allowing the optical fibers to be optically coupled to the light incident surface of the light guide portion.

\* \* \* \* \*